(12) United States Patent
Hoshi et al.

(10) Patent No.: US 12,542,153 B2
(45) Date of Patent: Feb. 3, 2026

(54) DISK DEVICE ATTACHING SLIDER TO SUSPENSION WITH ADHESIVE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Ryogo Hoshi, Yokohama Kanagawa (JP); Takuma Kido, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 25 days.

(21) Appl. No.: 18/589,341

(22) Filed: Feb. 27, 2024

(65) Prior Publication Data

US 2025/0095674 A1 Mar. 20, 2025

(30) Foreign Application Priority Data

Sep. 15, 2023 (JP) ................................. 2023-150136

(51) Int. Cl.
*G11B 5/48* (2006.01)
(52) U.S. Cl.
CPC .................................. *G11B 5/4826* (2013.01)
(58) Field of Classification Search
None
See application file for complete search history.

(56) References Cited

U.S. PATENT DOCUMENTS

| 5,774,305 | A | 6/1998 | Boutaghou | |
| 5,880,908 | A * | 3/1999 | Shiraishi | G11B 5/4826 360/234.6 |
| 6,282,063 | B1 | 8/2001 | Coon | |
| 7,006,330 | B1 * | 2/2006 | Subrahmanyam | G11B 5/4826 360/234.5 |
| 7,006,331 | B1 * | 2/2006 | Subrahmanyam | G11B 5/4826 360/234.6 |
| 7,113,372 | B2 * | 9/2006 | Segar | G11B 5/4826 360/245.9 |
| 7,995,310 | B1 * | 8/2011 | Pan | G11B 5/4826 360/234.6 |

(Continued)

FOREIGN PATENT DOCUMENTS

JP H07-153215 6/1995
JP 2013020669 A * 1/2013

*Primary Examiner* — William J Klimowicz
(74) *Attorney, Agent, or Firm* — Knobbe, Martens, Olson & Bear, LLP (57) ABSTRACT

According to one embodiment, a disk device includes a first adhesive attaching a slider to a suspension. A flexure of the suspension includes an outer surface of a metal plate and an insulator. The insulator surrounds the first adhesive. The insulator includes two first walls, a second wall, and a third wall. The first walls extend closer to each other toward a axis of a carriage. The second wall is spaced apart from the first walls and further away from the axis than the first walls. The third wall is located at a center of the insulator in a circumferential direction and is located between the first walls and the second wall. The third wall is shorter than the second wall. The distance between the second wall and the third wall is shorter than a distance between the first walls and the third wall.

15 Claims, 6 Drawing Sheets

(56) References Cited

U.S. PATENT DOCUMENTS

| | | | |
|---|---|---|---|
| 9,558,768 B1* | 1/2017 | Tsuchiya | G11B 5/4826 |
| 10,720,179 B1* | 7/2020 | Sedklang | G11B 5/4826 |
| 10,734,018 B1* | 8/2020 | Uehara | G11B 25/043 |
| 11,069,375 B1* | 7/2021 | Chawalitsittikul | G11B 5/5521 |
| 11,081,130 B1* | 8/2021 | Chawalitsittikul | G11B 5/4826 |
| 11,120,823 B1 | 9/2021 | Nesori et al. | |
| 2001/0013993 A1* | 8/2001 | Coon | G11B 5/60 360/234.6 |
| 2006/0203389 A1* | 9/2006 | Motonishi | G11B 5/4826 360/234.6 |
| 2006/0285249 A1* | 12/2006 | Hagiya | G11B 5/6005 |
| 2006/0285250 A1* | 12/2006 | Hagiya | G11B 5/6082 |
| 2006/0285251 A1* | 12/2006 | Hagiya | G11B 5/4826 360/234.5 |
| 2006/0285252 A1* | 12/2006 | Hagiya | H05K 3/305 360/234.5 |
| 2007/0263323 A1* | 11/2007 | Uematsu | G11B 5/4826 360/234.6 |
| 2024/0060421 A1* | 2/2024 | Van Bemmel | F01D 9/026 |

\* cited by examiner

DISK DEVICE ATTACHING SLIDER TO SUSPENSION WITH ADHESIVE

CROSS-REFERENCE TO RELATED APPLICATIONS

This application is based upon and claims the benefit of priority from Japanese Patent Application No. 2023-150136, filed on Sep. 15, 2023; the entire contents of which are incorporated herein by reference.

FIELD

Embodiments described herein relate generally to a disk device.

BACKGROUND

A disk device such as a hard disk drive typically includes suspensions having flexures and sliders mounted on the flexures. The sliders are attached to the respective flexures, for example, with an adhesive.

When attaching the slider to the suspension, the adhesive is pressed and spreads between the slider and the flexure. The spread adhesive may affect the resonance characteristics of the slider.

DETAILED DESCRIPTION

In general, according to one embodiment, a disk device includes a magnetic disk, a slider, a carriage, a suspension, and a first adhesive. The slider is configured to read and write information from and to the magnetic disk. The carriage is configured to rotate about a rotation axis. The suspension is attached to the carriage. The first adhesive attaches the slider to the suspension. The suspension includes a base plate attached to the carriage, a load beam attached to the base plate, and a flexure attached to the load beam. The flexure includes a metal plate, an outer surface of the metal plate, and an insulator. The first adhesive adheres the outer surface. The insulator is located on the outer surface to surround at least a part of the first adhesive. The insulator includes two first walls, a second wall, and a third wall. The two first walls extend closer to each other toward the rotation axis. The second wall is spaced apart from the two first walls and further away from the rotation axis than the two first walls. The second wall extends across a center of the insulator in a circumferential direction about the rotation axis. The third wall is located at least partially at the center of the insulator in the circumferential direction and is located between the two first walls and the second wall. The third wall is shorter in length than the second wall in the circumferential direction. The distance between the second wall and the third wall is shorter than a distance between each of the two first walls and the third wall.

Hereinafter, one embodiment will be described with reference to FIGS. 1 to 6. Note that, in the present specification, a component according to the embodiment and an explanation of the component may be described using a plurality of expressions. The component and the explanation thereof are examples, and are not limited by the expressions used in the present specification. The component may also be identified by a term different from those used in the present specification. In addition, the component may be explained using an expression different from those used in the present specification.

In the following description, "suppress" is defined as, for example, preventing an occurrence of an event, an action, or an influence, or reducing the degree of the event, the action, or the influence. Furthermore, in the following description, "restrict" is defined as, for example, preventing a movement or a rotation, or allowing a movement or a rotation within a predetermined range and preventing a movement or a rotation beyond the predetermined range.

Figure 1:
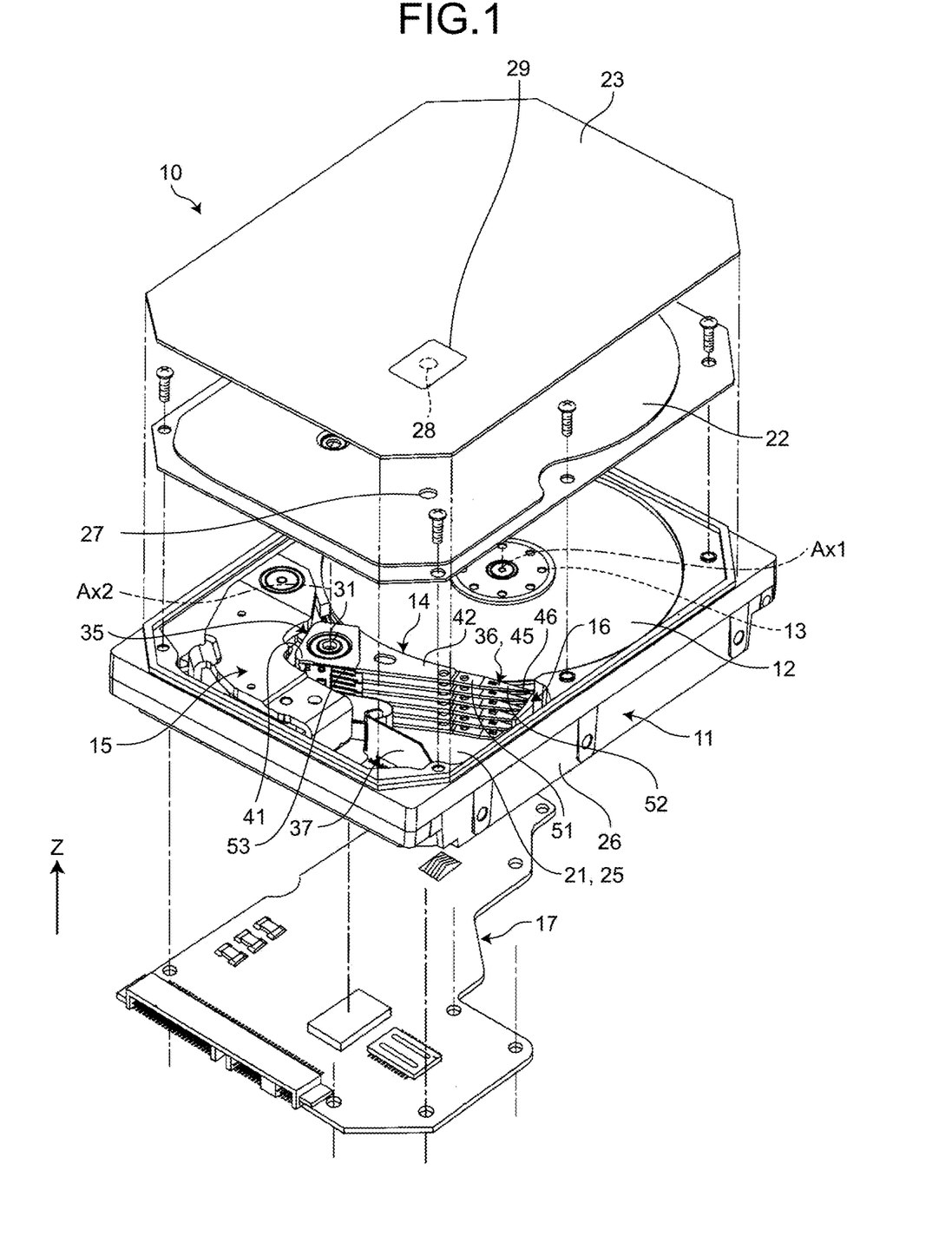
FIG. 1 is an exemplary exploded perspective view illustrating an HDD according to one embodiment.

FIG. 1 is an exemplary exploded perspective view illustrating a hard disk drive (HDD) 10 according to the present embodiment. The HDD 10 is an example of a disk device, and may also be referred to as an electronic device, a storage device, an external storage device, or a magnetic disk device.

As illustrated in FIG. 1, the HDD 10 includes a housing 11, a plurality of magnetic disks 12, a spindle motor 13, a head stack assembly (HSA) 14, a voice coil motor (VCM) 15, a ramp load mechanism 16, and a printed circuit board (PCB) 17. Note that the HDD 10 is not limited to this example.

As illustrated in FIG. 1, in the present specification, a Z axis and a Z direction are defined for convenience. The Z axis is virtually provided along the thickness of the HDD 10. The Z direction is a direction along the Z axis, and includes a +Z direction and a −Z direction. The +Z direction is a direction indicated by a Z-axis arrow. The −Z direction is a direction opposite to the +Z direction.

The housing 11 includes a base 21, an inner cover 22, and an outer cover 23. The base 21 has a substantially rectangular parallelepiped box shape opening in the +Z direction. The plurality of magnetic disks 12, the spindle motor 13, the HSA 14, the VCM 15, and the ramp load mechanism 16 are accommodated inside the base 21.

The base 21 has a bottom wall 25 and a side wall 26. The bottom wall 25 has a substantially rectangular (quadrangular) plate shape and is disposed substantially orthogonal to the Z direction. The side wall 26 protrudes in a substantially +Z direction from the edge of the bottom wall 25, and has a substantially rectangular frame shape.

The inner cover 22 is attached to an end of the side wall 26 in the +Z direction with, for example, a screw. The outer cover 23 covers the inner cover 22 and is attached to the end of the side wall 26 in the +Z direction by, for example, welding.

The inner cover 22 is provided with a vent 27. The outer cover 23 is provided with a vent 28. After the components are attached to the inside of the base 21, and the inner cover 22 and the outer cover 23 are attached to the base 21, air inside the housing 11 is removed from the vents 27 and 28. Furthermore, the housing 11 is filled with a gas different from air.

The gas filling the housing 11 is, for example, a low-density gas having a density lower than that of air, an inert gas having low reactivity, or the like. For example, helium is filled inside the housing 11. Note that the inside of the housing 11 may be filled with another fluid. The inside of the housing 11 may be maintained in a vacuum state, at a low pressure close to the vacuum state, or a negative pressure lower than the atmospheric pressure.

The vent 28 of the outer cover 23 is closed by a seal 29. The seal 29 airtightly seals the vent 28 to prevent a leakage of the fluid from the housing 11 through the vent 28.

The plurality of magnetic disks 12 are disposed orthogonal to the Z direction. A magnetic recording layer is provided on at least one of the upper surface and the lower surface of the magnetic disk 12. The plurality of magnetic disks 12 are stacked at intervals in the Z direction.

The spindle motor 13 supports the plurality of magnetic disks 12. The spindle motor 13 rotates the plurality of magnetic disks 12 about an axis Ax1 of the spindle motor 13. The axis Ax1 extends in the Z direction. The plurality of magnetic disks 12 are held by a hub of the spindle motor 13 using, for example, a clamp spring.

Figure 2:
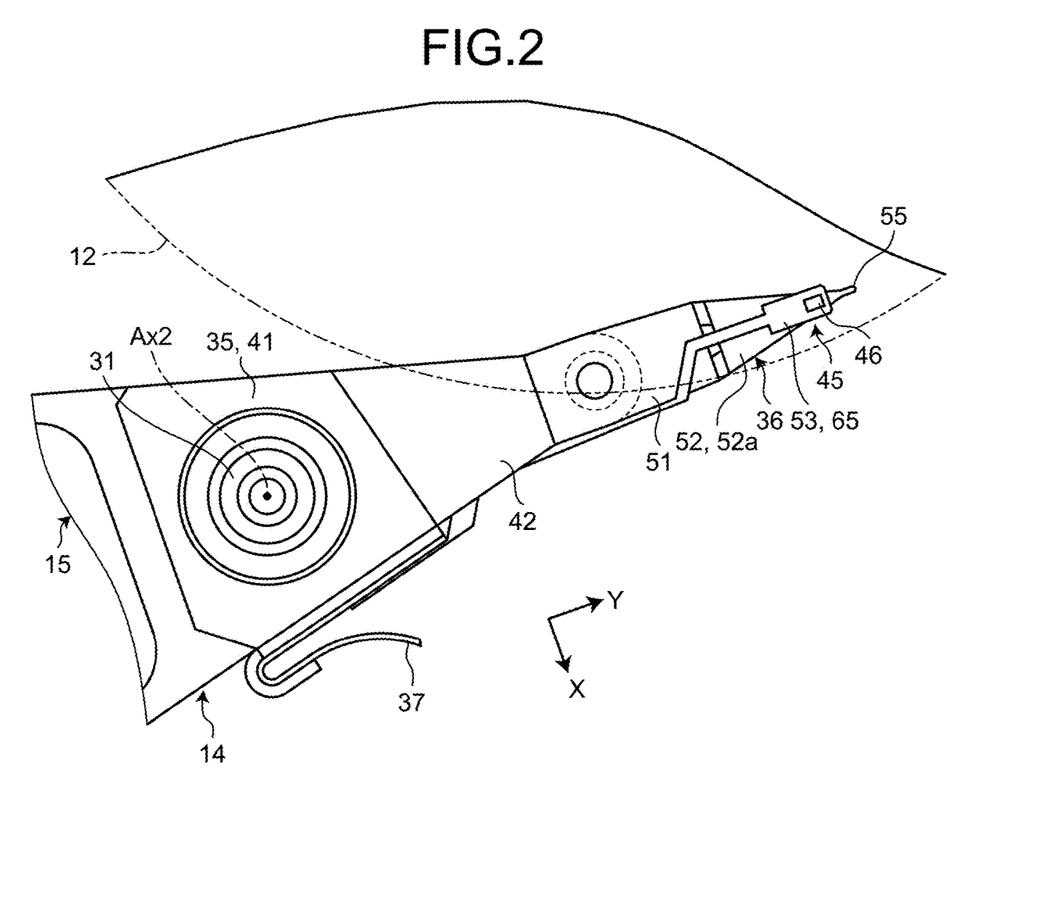
FIG. 2 is an exemplary plan view illustrating a magnetic disk and an HSA according to the embodiment.

FIG. 2 is an exemplary plan view illustrating the magnetic disk 12 and the HSA 14 according to the present embodiment. As illustrated in FIG. 2, the HSA 14 is rotatably supported by a support shaft 31. The support shaft 31 extends apart from the magnetic disk 12 in a direction orthogonal to the axis Ax1. The support shaft 31 extends, for example, in a substantially +Z direction from the bottom wall 25 of the housing 11.

The HSA 14 can rotate about an axis Ax2. The axis Ax2 is an example of a rotation axis, and is a virtual axis extending in the Z direction. The axis Ax2 is, for example, the center of rotation of the HSA 14 and also the axis of the support shaft 31.

For convenience, an axial direction, a radial direction, and a circumferential direction will be defined below. The axial direction is a direction along the axis Ax2. In the present embodiment, the axis Ax2 extends in the Z direction. Therefore, the axial direction includes the +Z direction and the −Z direction. The radial direction is a direction orthogonal to the axis Ax2, and includes a plurality of directions orthogonal to the axis Ax2. The circumferential direction is a direction about the axis Ax2, and includes a direction rotating clockwise about the axis Ax2 and a direction rotating counterclockwise about the axis Ax2.

The HSA 14 includes a carriage 35, a plurality of head gimbal assemblies (HGAs) 36, and a flexible printed circuit board (FPC) 37. The carriage 35 includes an actuator block 41 and a plurality of arms 42.

The actuator block 41 is rotatably supported by the support shaft 31, for example, via a bearing. Accordingly, the carriage 35 can rotate about the axis Ax2. The plurality of arms 42 protrude in the radial direction from the actuator block 41. Note that the carriage 35 may be divided, and the arms 42 may protrude from a plurality of actuator blocks 41, respectively.

In the present specification, an X axis and a Y axis will be further defined for convenience. The X axis, the Y axis, and the Z axis are orthogonal to each other. The Y axis is provided along the arms 42. In the present specification, an X direction and a Y direction will be further defined. The X direction is a direction along the X axis, and includes a +X direction indicated by an X-axis arrow and a −X direction which is an opposite direction of the X-axis arrow. The Y direction is a direction along the Y axis, and includes a +Y direction indicated by a Y-axis arrow and a −Y direction which is an opposite direction of the Y-axis arrow.

The plurality of arms 42 project in the +Y direction from the actuator block 41. The Y direction is a longitudinal direction of the arm 42. The Y direction is included in the radial direction. The X direction is a lateral direction of the arm 42. The X direction and the Y direction change as the carriage 35 rotates about the axis Ax2.

The plurality of arms 42 are arranged at intervals in the axial direction. Each of the arms 42 has a plate shape to enter a gap between two adjacent ones of the plurality of magnetic disks 12. The plurality of arms 42 extend substantially in parallel.

A voice coil of the VCM 15 is attached to the actuator block 41. The support shaft 31 is located between the arm 42 and the voice coil. The VCM 15 includes the voice coil, a pair of yokes, and magnets provided on the yokes.

Each of the plurality of HGAs 36 is attached to a +Y directional end of a corresponding one of the plurality of arms 42. The HGA 36 protrudes substantially in the +Y direction from the corresponding arm 42. As a result, the plurality of HGAs 36 are arranged at intervals in the axial direction.

Figure 3:
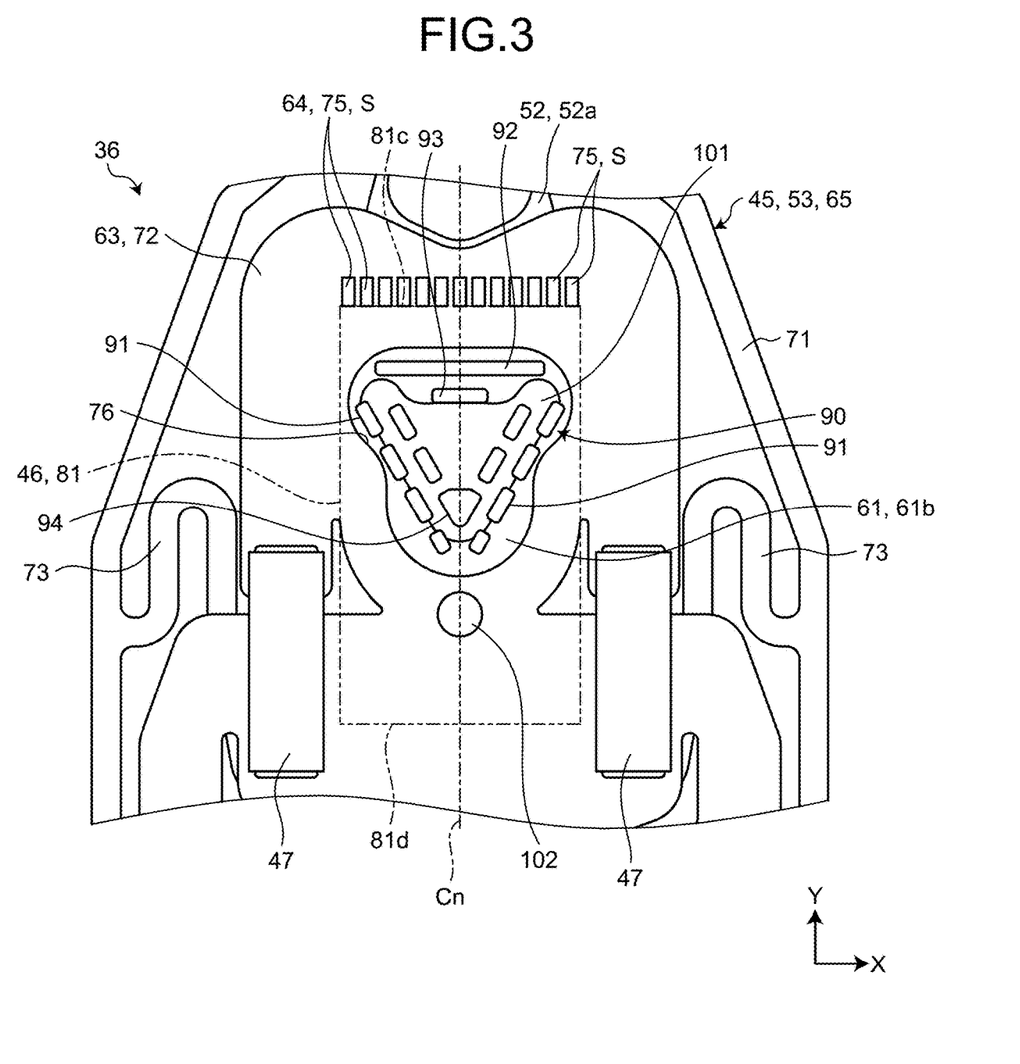
FIG. 3 is an exemplary plan view illustrating a part of the HGA of the embodiment.

FIG. 3 is an exemplary plan view illustrating a part of the HGA 36 according to the present embodiment. As illustrated in FIG. 3, each of the plurality of HGAs 36 includes a suspension 45, a slider 46, and two microactuators (MAs) 47. The slider 46 may also be referred to as a magnetic head. FIG. 3 virtually illustrates the slider 46 by a two-dot chain line.

As illustrated in FIG. 2, the suspension 45 includes a base plate 51, a load beam 52, and a flexure 53. The base plate 51 and the load beam 52 are made of, for example, stainless steel. Note that the material of the base plate 51 and the load beam 52 is not limited to this example.

The base plate 51 is attached to the end of the arm 42 in the +Y direction. As a result, the base plate 51 of the suspension 45 is attached to the carriage 35.

The load beam 52 is of a plate form in a thinner thickness than the base plate 51. The load beam 52 is attached to the base plate 51 to protrude from the base plate 51 substantially in the +Y direction.

Figure 4:
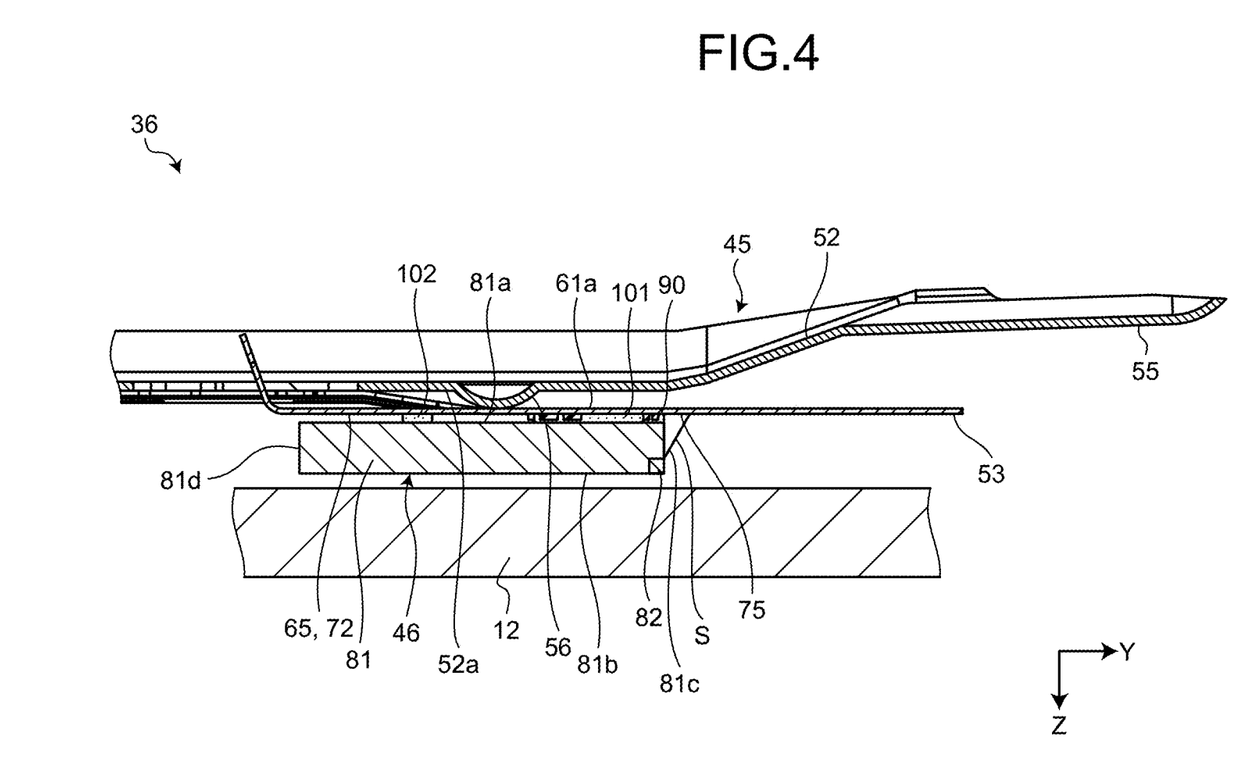
FIG. 4 is an exemplary cross-sectional view partially illustrating the magnetic disk and the HGA according to the embodiment.

FIG. 4 is an exemplary cross-sectional view partially illustrating the magnetic disk 12 and the HGA 36 according to the present embodiment. As illustrated in FIG. 4, the load beam 52 has a bottom surface 52a. The bottom surface 52a is substantially flat. The bottom surfaces 52a of the respective HGAs 36 face their corresponding magnetic disks 12.

The load beam 52 further includes a lift tab 55 and a dimple 56. The lift tab 55 is provided at an end of the load beam 52 in the +Y direction. The dimple 56 protrudes from the bottom surface 52a at a position closer to the axis Ax2 than the lift tab 55. The dimple 56 has a substantially hemispherical shape. Note that the dimple 56 may have another shape.

Figure 5:
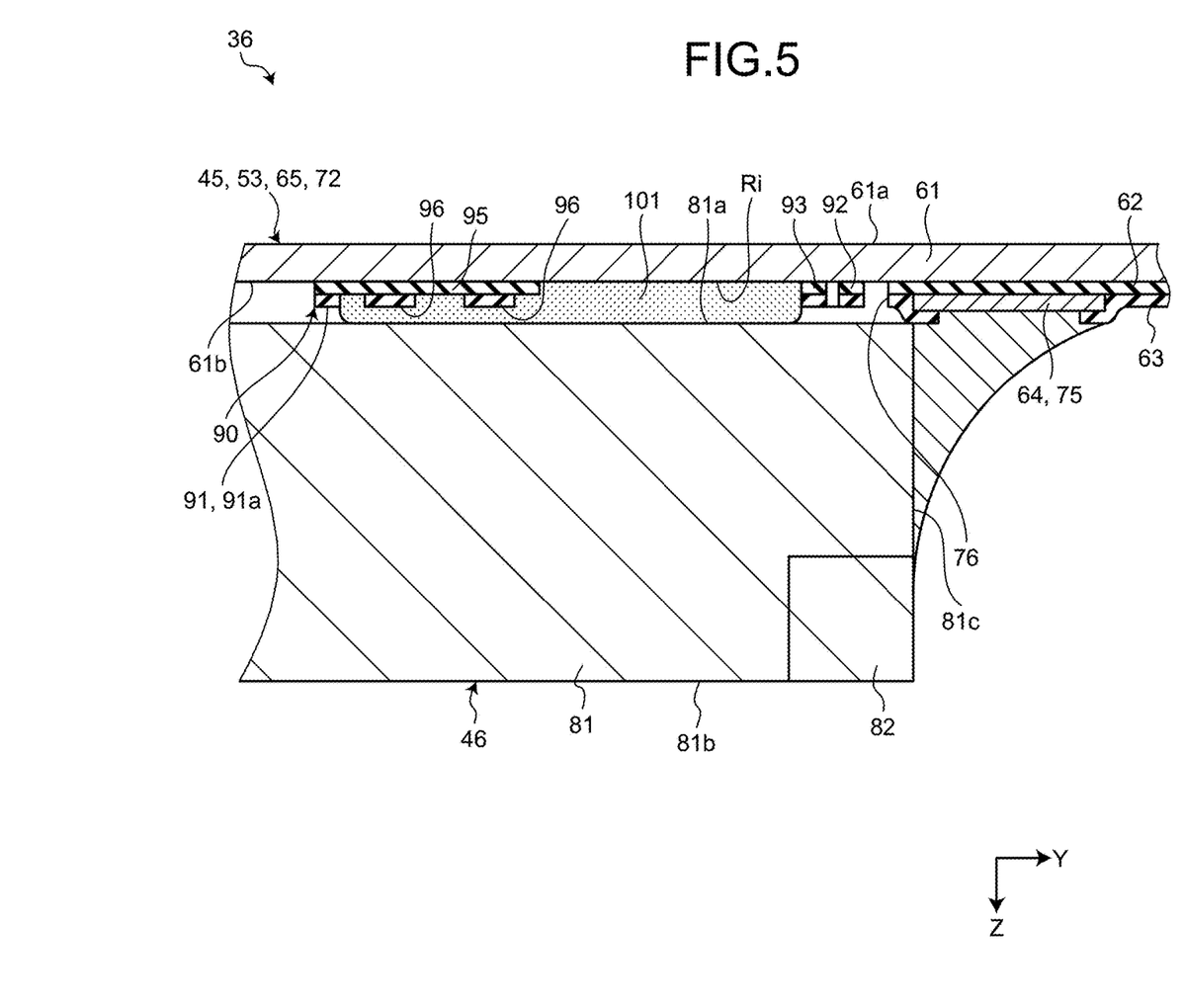
FIG. 5 is an exemplary cross-sectional view illustrating a part of the HGA according to the embodiment.

FIG. 5 is an exemplary cross-sectional view illustrating a part of the HGA 36 according to the present embodiment. As illustrated in FIG. 5, the flexure 53 includes a backing plate 61, a base layer 62, a cover layer 63, and a conductive layer 64. That is, the flexure 53 is a kind of FPC in which insulating layers and conductive layers are stacked on top of one another. The backing plate 61 is an example of a metal plate. The base layer 62 is an example of a first insulating layer. The cover layer 63 is an example of a second insulating layer.

The backing plate 61 is made of, for example, metal such as stainless steel. The backing plate 61 has two surfaces 61a and 61b. The surface 61b is an example of an outer surface. The surface 61a is substantially flat, and faces the bottom surface 52a of the load beam 52. The dimple 56 contacts the surface 61a. The surface 61b is opposite to the surface 61a.

The base layer 62 and the cover layer 63 are made of, for example, an insulator such as polyimide (PI). The base layer 62 is provided on the surface 61b of the backing plate 61. Note that the shape of the backing plate 61 and the shape of the base layer 62 are different from each other. That is, a part of the base layer 62 does not cover the surface 61b of the backing plate 61 but is provided apart from the backing plate 61. The cover layer 63 covers the base layer 62. Thus, the base layer 62 is located between the backing plate 61 and the cover layer 63.

The conductive layer 64 is made of, for example, a conductor such as copper. The conductive layer 64 has various conductor patterns such as wiring patterns, pads (lands), and ground planes. The conductive layer 64 is located between the base layer 62 and the cover layer 63.

As illustrated in FIG. 2, the flexure 53 has an elongated band shape. The flexure 53 includes a gimbal 65 (elastic support). The gimbal 65 is provided at an end of the flexure 53 in the +Y direction.

As illustrated in FIG. 3, the gimbal 65 includes a frame 71, a mount 72, and two connections 73. The frame 71 and the connections 73 include at least a part of the backing plate 61. The mount 72 includes a part of each of the backing plate 61, the base layer 62, the cover layer 63, and the conductive layer 64.

The frame 71 surrounds, for example, the mount 72 and the connections 73. The frame 71 is attached to the bottom surface 52a of the load beam 52, for example, by welding. That is, the flexure 53 is attached to the load beam 52. The mount 72 is located inside the frame 71. The two connections 73 connect the frame 71 and the mount 72 to each other.

As illustrated in FIG. 4, the mount 72 is supported by the dimple 56. Thus, the mount 72 can rotate about the apex of the dimple 56. When the mount 72 rotates, the connections 73 are elastically deformed between the frame 71 and the mount 72.

As illustrated in FIG. 3, in the mount 72, the conductive layer 64 includes a plurality of pads 75. The plurality of pads 75 are arranged in the X direction. Each of the plurality of pads 75 is exposed to the outside of the flexure 53 through a hole provided in the cover layer 63.

The mount 72 is provided with an exposure hole 76. The exposure hole 76 penetrates through the base layer 62, the cover layer 63, and the conductive layer 64. Therefore, the surface 61b of the backing plate 61 is exposed to the outside of the flexure 53 through the exposure hole 76. The exposure hole 76 is located between the pad 75 and the axis Ax2.

As illustrated in FIG. 2, an end of the flexure 53 in the −Y direction is connected to one end of the FPC 37, for example, on the actuator block 41. The other end of the FPC 37 is connected to a connector provided on the bottom wall 25.

As illustrated in FIG. 3, the slider 46 is mounted on the mount 72 of the gimbal 65. The slider 46 is located between the pad 75 and the axis Ax2 to cover the exposure hole 76. As illustrated in FIG. 4, the slider 46 includes a slider body 81 and a head element 82.

The slider body 81 has a substantially rectangular parallelepiped block shape. Note that the shape of the slider body 81 is not limited to this example. The slider body 81 has an attachment surface 81a, a floating surface 81b, a trailing end 81c, and a leading end 81d. The floating surface 81b may also be referred to as an air bearing surface (ABS).

As illustrated in FIG. 5, the attachment surface 81a faces the flexure 53. The attachment surface 81a faces the surface 61b of the backing plate 61 through the exposure hole 76. The floating surface 81b is opposite to the attachment surface 81a. The floating surface 81b is substantially flat. Note that the floating surface 81b may be provided with a hole, a recess, or a cutout. The trailing end 81c is an end of the slider body 81 in the +Y direction. As illustrated in FIG. 4, the leading end 81d is an end of the slider body 81 in the −Y direction.

The head element 82 is attached to the slider body 81 or built in the slider body 81. The head element 82 is provided at the trailing end 81c of the slider body 81. The head element 82 records and reproduces information on and from a corresponding one of the plurality of magnetic disks 12. That is, the slider 46 reads and writes information from and to the magnetic disk 12.

The head element 82 includes, for example, a write element that records information on the magnetic disk 12 and a read element that reproduces information from the magnetic disk 12. The magnetic recording layer of the magnetic disk 12 is magnetized in a predetermined direction by a magnetic field generated by the write element to record information. The information recorded on the magnetic disk 12 is read by the read element. At least when the head element 82 reads/writes information from/to the magnetic disk 12, the floating surface 81b faces the magnetic disk 12 with a minute gap therebetween.

Electrodes of the head element 82 of the slider 46 are joined to the plurality of pads 75 by, for example, solder S. As a result, the FPC 37 is electrically connected to the head element 82 via the flexure 53.

The slider 46 is supported by the dimple 56, for example, via the mount 72. The slider 46 and the mount 72 can integrally rotate about the apex of the dimple 56 with respect to the frame 71.

The MA 47 in FIG. 3 is, for example, a bulk piezoelectric element. Note that the MA 47 may be a bulk multilayer or thin-film piezoelectric element. Each of the two MAs 47 is mounted on the mount 72. The MA 47 expands and contracts according to an applied voltage. As the two MAs 47 individually expand and contract, the mount 72 is elastically deformed, and the slider 46 rotates.

The VCM 15 illustrated in FIG. 1 rotates the carriage 35 about the axis Ax2. As the carriage 35 rotates, the HGA 36 attached to the arm 42 also rotates. That is, the suspension 45 including the base plate 51, the load beam 52, and the flexure 53 and the slider 46 rotate about the axis Ax2. The carriage 35 rotates about the axis Ax2 to move the slider 46 to a desired position on the magnetic disk 12.

When the slider 46 moves to the outermost circumstance of the magnetic disk 12 as the carriage 35 is rotated by the VCM 15, the ramp load mechanism 16 holds the HGA 36. While the HGA 36 is held by the ramp load mechanism 16, the slider 46 is apart from the magnetic disk 12.

The PCB 17 is, for example, a rigid board such as a glass epoxy board, a multilayer board, a build-up board, or the like. The PCB 17 is disposed outside the housing 11, and is attached to the bottom wall 25 of the base 21.

Various electronic components such as a relay connector connected to the FPC 37, an interface (I/F) connector connected to a host computer, and a controller that controls an operation of the HDD 10 are mounted on the PCB 17. The relay connector is electrically connected to the FPC 37 via a connector provided on the bottom wall 25.

The PCB 17 is electrically connected to the slider 46 and the MA 47 through the FPC 37 and the flexure 53. The controller of the PCB 17 causes the head element 82 of the slider 46 to read and write information from and to the magnetic disk 12. In addition, the controller of the PCB 17 expands and contracts the MA 47 to adjust the position of the head element 82.

Figure 6:
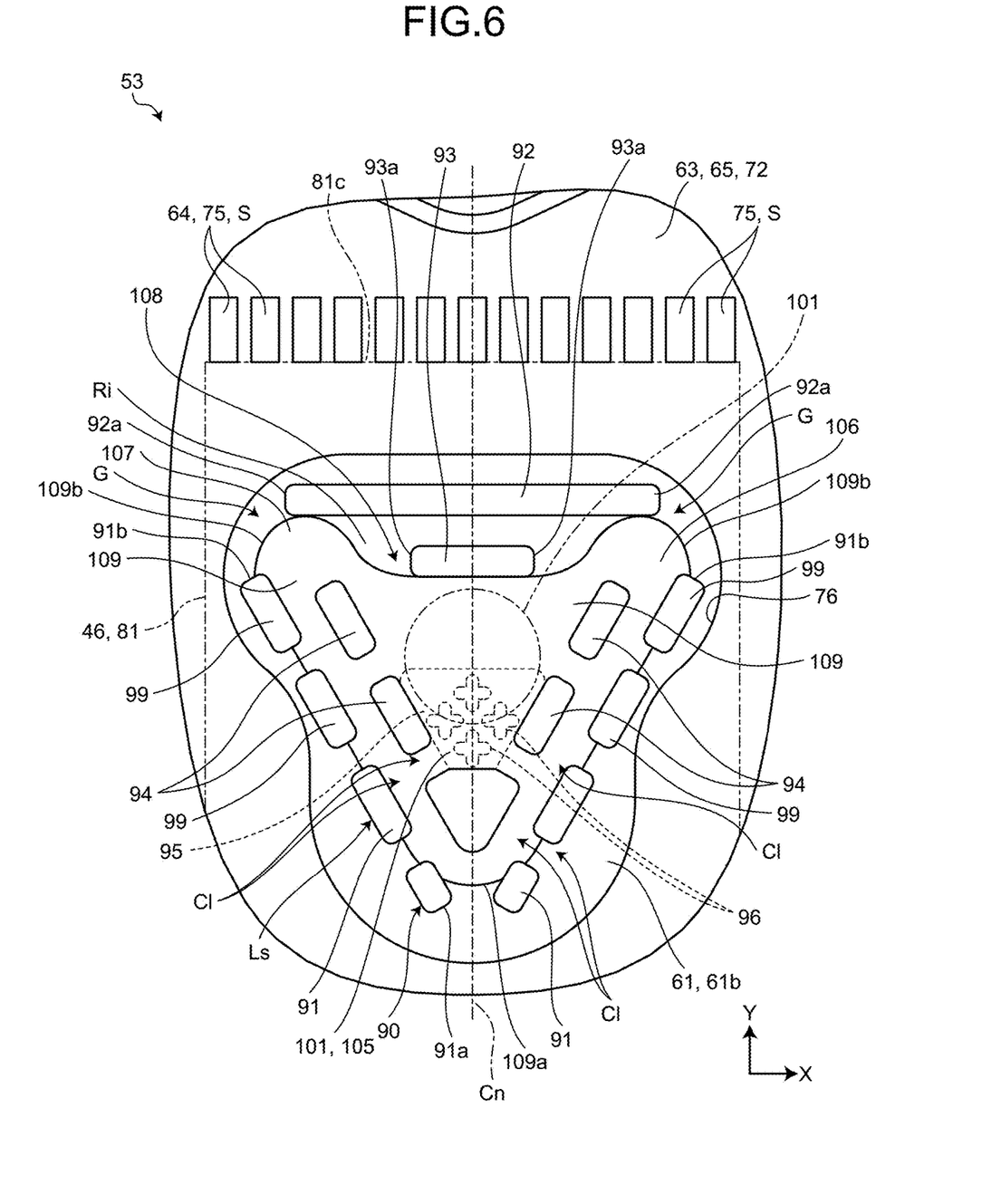
FIG. 6 is an exemplary plan view illustrating a part of a flexure according to the embodiment.

FIG. 6 is an exemplary plan view illustrating a part of the flexure 53 according to the present embodiment. As illustrated in FIG. 6, the flexure 53 further includes a PI pattern 90. The PI pattern 90 is an example of an insulator. Note that the material of the insulator is not limited to PI.

In the present embodiment, the PI pattern 90 is formed as a part of the base layer 62 and the cover layer 63 during the manufacture of the flexure 53. That is, at the time of forming the base layer 62, a part of the PI pattern 60 is formed simultaneously as a part of the base layer 62. Further, at the time of forming the cover layer 63, the rest of the PI pattern 60 is formed simultaneously as a part of the cover layer 63.

As described above, the PI pattern 90 includes at least one of a part of the base layer 62 and a part of the cover layer 63. In addition, the PI pattern 90 is made of PI, as with the base layer 62 and the cover layer 63. In this manner, the PI pattern 90 is included in at least one of the base layer 62 and the cover layer 63. Note that the PI pattern 90 may be different from the base layer 62 and the cover layer 63.

The PI pattern 90 is formed on the exposed surface 61$b$ of the backing plate 61 through the exposure hole 76. In other words, the PI pattern 90 protrudes from the surface 61$b$ of the backing plate 61. The PI pattern 90 is spaced apart from the rest of the base layer 62 and the rest of the cover layer 63. Note that the PI pattern 90 may be integrated with at least one of the rest of the base layer 62 and the rest of the cover layer 63.

The PI pattern 90 includes two first walls 91, a second wall 92, a third wall 93, a plurality of fourth walls 94, a table 95, and a plurality of protrusions 96. Note that the PI pattern 90 is not limited to this example. The two first walls 91 and the plurality of fourth walls are examples of a plurality of walls. The table 95 is an example of a sixth wall.

The two first walls 91 extend closer to each other toward the axis Ax2. In the present embodiment, a $-Y$ directional end 91$a$ of one of the first walls 91 and a $-Y$ direction end 91$a$ of the other one of the first walls 91 are spaced apart from each other in the X direction. Note that the ends 91$a$ of the two first walls 91 may be connected to each other. A $+Y$ directional end 91$b$ of one of the first walls 91 and a $+Y$ directional end 91$b$ of the other one of the first walls 91 are spaced apart from each other in the X direction. A distance between the ends 91$a$ of the two first walls 91 is shorter than a distance between the ends 91$b$ of the two first walls 91. That is, the two first walls 91 have a substantially V-shape.

In the present embodiment, each of the two first walls 91 extends linearly. However, each of the two first walls 91 may extend in a curved shape or may be bent at least at one location. The two first walls 91 may extend in such a manner that they are partially, substantially parallel to each other.

In the present embodiment, each of the two first walls 91 has a plurality of separate walls 99. The plurality of separate walls 99 are examples of a plurality of fifth walls and a plurality of walls. In each first wall 91, the plurality of separate walls 99 are spaced apart from each other in a direction in which the first wall 91 extends. Note that the first wall 91 may not be divided into the plurality of separate walls 99 but extend linearly between the end 91$a$ and the end 91$b$.

The second wall 92 is disposed further apart from the axis Ax2 than the two first walls 91. The second wall 92 extends substantially in the X direction across the center Cn of the PI pattern 90 in the circumferential direction.

The center Cn substantially matches the center of the PI pattern 90 in the X direction. In addition, in the present embodiment, the center Cn substantially matches the center of the load beam 52 in the X direction, and substantially matches the center of the gimbal 65 in the X direction.

The second wall 92 extends between the vicinity of the end 91$b$ of one of the first walls 91 and the vicinity of the end 91$b$ of the other one of the first walls 91. However, the second wall 92 is spaced apart from the two first walls 91. There is a gap G between an end 92$a$ of the second wall 92 and the end 91$b$ of the first wall 91 in the X direction. Thus, there are two gaps G in the PI pattern 90.

The two first walls 91 and the second wall 92 are arranged in a substantially triangular shape, which creates a substantially triangular region Ri inside the two first walls 91 and the second wall 92. The region Ri is a part of the surface 61$b$ of the backing plate 61, which is surrounded by the two first walls 91 and the second wall 92. The region Ri communicates with the outside of the region Ri through the gaps G.

The third wall 93 stands in the region Ri. The third wall 93 is thus located between the two first walls 91 and the second wall 92. The third wall 93 is located at least partially at the center Cn. In the present embodiment, the third wall 93 extends substantially in the X direction across the center Cn. Note that the third wall 93 is not limited to this example, and may extend in a substantially Y direction, for example, at the center Cn.

The third wall 93 is shorter in length than the second wall 92 in the circumferential direction. In other words, the third wall 93 is shorter in length than the second wall 92 in the X direction. Both ends 93$a$ of the third wall 93 are located between both ends 92$a$ of the second wall 92 in the X direction.

The third wall 93 is located in the vicinity of the second wall 92. Because of this, a distance between the second wall 92 and the third wall 93 is shorter than a distance between each of the two first walls 91 and the third wall 93. The third wall 93 may be connected to the second wall 92.

The plurality of fourth walls 94 stand in the region Ri and are spaced apart from the two first walls 91, the second wall 92, and the third wall 93. Further, the plurality of fourth walls 94 are spaced apart from each other. Each of the plurality of fourth walls 94 is located in the vicinity of the two first walls 91, and extends along a corresponding one of the two first walls 91.

An interval Cl extends between every two adjacent fourth walls 94. The interval Cl also extends between each of the plurality of fourth walls 94 and a corresponding one of the two first walls 91. In addition, the interval Cl extends between every two adjacent separate walls 99.

The interval Cl is relatively narrow and bent at a plurality of locations. Such an interval Cl works to cause resistance against a fluid flowing thereinto, such as an unsolidified adhesive, to restrict the fluid from passing through the interval Cl. That is, the first walls 91 and the fourth walls 94 are disposed with the intervals Cl to form a labyrinth seal Ls. In other words, the PI pattern 90 includes such a labyrinth seal Ls that restricts a passage of a fluid such as an unsolidified adhesive at the intervals Cl among the two first walls 91, the plurality of fourth walls 94, and the plurality of separate walls 99.

The table 95 is located in the region Ri, and is spaced apart from the second wall 92 and the third wall 93 in the $-Y$ direction. The table 95 is thus located between the two first walls 91. As illustrated in FIG. 5, in a substantially Z direction orthogonal to the surface 61*b* of the backing plate 61, the table 95 has a smaller thickness than each of the two first walls 91 and than the second wall 92.

As illustrated in FIG. 6, the plurality of protrusions 96 are located in the region Ri and are spaced apart from the second wall 92 in the −Y direction. Namely, the plurality of protrusions 96 are located between the two first walls 91. Each of the protrusions 96 protrudes from the surface 61*b* of the backing plate 61. Note that, in the present embodiment, the plurality of protrusions 96 are integrated with the table 95.

The plurality of protrusions 96 are spaced apart from each other and from the two first walls 91, the second wall 92, and the plurality of fourth walls 94. In the present embodiment, each of the plurality of protrusions 96 has a cross shape. Note that the shape of the protrusion 96 is not limited to this example, and may be, for example, a hemispherical shape, a linear shape, or another shape. Note that the protrusion 96 is not limited to this example.

As illustrated in FIG. 4, each of the plurality of HGAs 36 further includes two adhesives 101 and 102. The adhesive 101 is an example of a first adhesive and an adhesive. The adhesive 102 is an example of a second adhesive. The adhesives 101 and 102 attach the slider 46 to the flexure 53 of the suspension 45.

As illustrated in FIG. 5, the adhesive 101 adheres to the surface 61*b* of the backing plate 61 exposed by the exposure hole 76, and adheres to the attachment surface 81*a* of the slider body 81. As a result, the adhesive 101 adheres the slider 46 to the surface 61*b* of the backing plate 61. At least a part of the adhesive 101 is interposed between the surface 61*b* of the backing plate 61 and the attachment surface 81*a* of the slider body 81.

As illustrated in FIG. 6, the adhesive 101 adheres to the region Ri. Therefore, the PI pattern 90 surrounds at least a part of the adhesive 101.

Specifically, the two first walls 91 and the second wall 92 arranged in a substantially triangular shape surround at least a part of the adhesive 101.

The adhesive 101 spreads in a substantially V-shape along the two first walls 91, the second wall 92, and the third wall 93. For example, the adhesive 101 has a first part 105, a second part 106, and a third part 107.

The first part 105 is located between the two first walls 91. In the present embodiment, the first part 105 adheres to at least one of the two first walls 91, adheres to at least one of the plurality of fourth walls 94, adheres to the table 95, and adheres to the plurality of protrusions 96. The first part 105 covers the table 95 and the plurality of protrusions 96.

The first part 105 is partially interposed between the table 95 and the attachment surface 81*a* of the slider body 81. In addition, the first part 105 is partially interposed between the protrusion 96 and the attachment surface 81*a* of the slider body 81. In this manner, the first part 105 attaches the slider 46 to the table 95 and the plurality of protrusions 96 of the flexure 53.

The second part 106 protrudes from the first part 105 in an oblique direction between the +X direction and the +Y direction. The second part 106 is thus located between one of the two first walls 91 and the third wall 93. A part of the second part 106 may extend to outside the region Ri through the gap G.

The third part 107 protrudes from the first part 105 in an oblique direction between the −X direction and the +Y direction. Therefore, the third part 107 is located between the other one of the two first walls 91 and the third wall 93. A part of the third part 107 may extend to outside the region Ri through the gap G.

The third wall 93 is located between the second part 106 and the third part 107. In other words, the second part 106 and the third part 107 are spaced apart from each other in the X direction by the third wall 93.

The adhesive 101 is provided with a recess 108 opening toward the second wall 92. The recess 108 is located between the second part 106 and the third part 107. Note that a part of the adhesive 101 may cover the third wall 93 to connect the second part 106 and the third part 107 to each other.

In other words, the adhesive 101 has two extending parts 109. The two extending parts 109 extend closer to each other toward the axis Ax2. Each of the two extending parts 109 has an end 109*a* in the −Y direction and an end 109*b* in the +Y direction. The end 109*a* is an example of a first end. The end 109*b* is an example of a second end.

The end 109*a* of one of the two extending parts 109 and the end 109*a* of the other one of the two extending parts 109 are connected to each other. The end 109*b* of one of the two extending parts 109 and the end 109*b* of the other one of the two extending parts 109 are spaced apart from each other in the circumferential direction. In other words, the ends 109*b* of the two extending parts 109 are spaced apart from each other in the X direction. In this manner, the two extending parts 109 extend in a substantially V-shape.

The third wall 93 is located between the end 109*b* of one of the two extending parts 109 and the end 109*b* of the other one of the two extending parts 109. That is, the end 109*b* of one of the two extending parts 109 and the end 109*b* of the other one of the two extending parts 109 are spaced apart from each other in the X direction by the third wall 93.

The adhesive 101 is spaced apart from the plurality of pads 75 in the −Y direction. In the present embodiment, the second wall 92 is located between the plurality of pads 75 and the adhesive 101. The third wall 93 is also located between the plurality of pads 75 and the adhesive 101. Note that a part of the adhesive 101 may be located closer to the pads 75 than the second wall 92 and the third wall 93.

As illustrated in FIG. 4, the adhesive 102 is spaced apart from the PI pattern 90 and the adhesive 101 in the −Y direction. Therefore, the adhesive 102 is closer to the axis Ax2 than the PI pattern 90 and the adhesive 101.

The adhesive 102 adheres to the mount 72 and to the attachment surface 81*a* of the slider body 81. As a result, the two adhesives 101 and 102 individually adhere the slider 46 to the mount 72 of the flexure 53. The adhesive 101 has a larger volume than the adhesive 102. Note that the adhesive 102 may be omitted.

Hereinafter, a part of a method of mounting the slider 46 will be exemplified. Note that the method of mounting the slider 46 is not limited to the following method, and another method may be used. First, for example, a dispenser applies the adhesive 101 to the surface 61*b* of the backing plate 61 exposed by the exposure hole 76. In FIG. 6, the adhesive 101 applied to the backing plate 61 is virtually illustrated a two-dot chain line. Further, the dispenser applies the adhesive 102 to the mount 72. The adhesives 101 and 102 may be applied to the attachment surface 81*a* of the slider body 81.

Next, for example, a mounter places the slider 46 on the flexure 53. As a result, each of the adhesives 101 and 102 adheres to the attachment surface 81*a* of the slider body 81.

The mounter pushes the slider 46 toward the flexure 53. As a result, a part of the adhesive 101 is crushed between the surface 61b of the backing plate 61 and the attachment surface 81a of the slider body 81. Further, another part of the adhesive 101 is crushed between the table 95 or the protrusions 96 and the attachment surface 81a. The adhesive 102 is crushed between the mount 72 and the attachment surface 81a. The adhesives 101 and 102 spreads along the attachment surface 81a.

A part of the adhesive 101 spreads toward the plurality of pads 75. However, the third wall 93 is located between the adhesive 101 and the pads 75. Therefore, when the adhesive 101 reaches the third wall 93, the third wall 93 stops or slows down the flow of the adhesive 101 towards the pads 75.

A part of the adhesive 101 spreads in the X direction along the third wall 93. In addition, another part of the adhesive 101 spreads toward the gap G. However, the second wall 92 is located between the adhesive 101 and the pads 75. Therefore, when the adhesive 101 reaches the second wall 92, the second wall 92 stops or slows down the flow of the adhesive 101 towards the pads 75.

The adhesive 101 is applied to the center Cn of the PI pattern 90 in the circumferential direction. Therefore, a part of the adhesive 101 located at the center Cn approaches the pads 75 earlier than the other part of the adhesive 101. However, the third wall 93 stops or slows down the flow of the adhesive 101 along the center Cn. In this manner, the third wall 93 restricts the adhesive 101 from reaching the pads 75 along the center Cn.

A part of the adhesive 101 may reach the gap G or flow out of the PI pattern 90 through the gap G. The volume of the adhesive 101 is set not to reach the pads 75 even if the adhesive 101 flows out of the PI pattern 90 through the gap G.

A space between the table 95 and the attachment surface 81a of the slider body 81 is narrower than a space between the surface 61b of the backing plate 61 and the attachment surface 81a. Therefore, a part of the adhesive 101 adhering to the table 95 flows into a relatively wide space between the surface 61b and the attachment surface 81a. In other words, at least a part of the adhesive 101 adhering to the table 95 flows toward the plurality of pads 75. The flow of the adhesive 101 is stopped or slowed down by the third wall 93 and the second wall 92, as described above.

Another part of the adhesive 101 adhering to the table 95 flows toward the axis Ax2. However, the plurality of fourth walls 94 are located between the adhesive 101 and the axis Ax2. Therefore, when the adhesive 101 reaches the fourth wall 94, the fourth wall 94 stops or slows down the flow of the adhesive 101 toward the axis Ax2.

When a part of the adhesive 101 flows into the interval Cl, the adhesive 101 in the interval Cl faces difficulty in passing through the interval Cl. That is, a labyrinth seal Ls stops or slows down the flow of the adhesive 101 which is an unsolidified fluid.

The adhesive 101 adhering to the plurality of protrusions 96 easily remain on the surfaces of the protrusions 96, for example, due to surface tension. In addition, a part of each of the protrusions 96 having a cross shape extends in a direction intersecting the flow of the adhesive 101. Therefore, the protrusions 96 stop or slow down the flow of the adhesive 101.

As described above, the PI pattern 90 restricts the adhesive 101 from flowing toward the pad 75 and the axis Ax2. On the other hand, the PI pattern 90 allows the adhesive 101 to flow toward the two gaps G. Therefore, a larger portion of the adhesive 101 spreads in a substantially X direction in the vicinity of the second wall 92 and the third wall 93.

Next, a plurality of pieces of solder S (solder paste) are applied to the electrodes of the head element 82 and the pads 75 by, for example, a dispenser. Next, by heating the slider 46 and the flexure 53, the adhesives 101 and 102 is cured, and the solder S joins the electrodes of the head element 82 and the pads 75 to each other. As described above, the slider 46 is mounted on the flexure 53.

In the HDD 10 according to the present embodiment described above, the slider 46 is attached to the suspension 45 with the adhesive 101. The flexure 53 of the suspension 45 includes a backing plate 61, a surface 61b of the backing plate 61 to which the adhesive 101 adheres, and a PI pattern 90 formed on the surface 61b to surround at least a part of the adhesive 101. The PI pattern 90 has two first walls 91, a second wall 92, and a third wall 93. The two first walls 91 extend closer to each other toward the axis Ax2 of the carriage 35. The second wall 92 is located apart from the two first walls 91 and further away from the axis Ax2 than the two first walls 91, and extends across the center Cn of the PI pattern 90 in the circumferential direction about the axis Ax2. The third wall 93 is located at least partially at the center Cn of the PI pattern 90 in the circumferential direction and between the two first walls 91 and the second wall 92. The third wall 93 is shorter in length than the second wall 92 in the circumferential direction. A distance between the second wall 92 and the third wall 93 is shorter than a distance between each of the two first walls 91 and the third wall 93.

To attach the slider 46 to the surface 61b of the backing plate 61 using the adhesive 101, the adhesive 101 is pressed and spreads between the slider 46 and the surface 61b. The PI pattern 90 restricts the adhesive 101 from spreading. That is, the PI pattern 90 can avoid the adhesive 101 from spreading beyond the PI pattern 90. In general, by using the adhesive 101 for fixing the slider 46, the adhesive 101 when largely spread can firmly attach the slider 46 to the flexure 53, however, it may deteriorate the resonance characteristics (e.g., frequency response) of the slider 46. In this regard, the HDD 10 according to the present embodiment can prevent or reduce deterioration in resonance characteristics of the slider 46 by restricting the spread of the adhesive 101. Further, the adhesive 101 adhered to the PI pattern 90 can increase the adhesive area between the adhesive 101 and the flexure 53. Thereby, the slider 46 can be more firmly attached to the flexure 53, leading to prevent the flexure 53 from falling or coming off. As such, according to the HDD 10, the slider 46 can be improved in terms of durability against impact. Furthermore, the HDD 10 can facilitate the mounting of the slider 46 during manufacturing, thereby improving the yield.

The two first walls 91 are disposed such that the space therebetween is narrowed toward the axis Ax2, allowing the adhesive 101 to flow toward the second wall 92. Applying a larger amount of the adhesive 101 for fixing the slider 46 in the vicinity of the trailing end 81c of the slider 46 can generally improve the resonance characteristics of the slider 46. In this regard the HDD 10 according to the present embodiment can prevent or reduce deterioration in resonance characteristics of the slider 46 by causing the adhesive 101 to flow toward the trailing end 81c of the slider 46.

In the circumferential direction, the part of the adhesive 101 at the center Cn approaches the second wall 92 earlier than both ends of the adhesive 101. However, the third wall 93 located at the circumferential center Cn of the PI pattern 90 obstructs the flow of the adhesive 101. Thus, the third wall 93 branches the adhesive 101 and allows the adhesive 101 to flow towards the gaps G between the first walls 91 and the second wall 92. Namely, the HDD 10 according to the present embodiment can restrict the circumferential center Cn part of the adhesive 101 from spreading beyond the second wall 92 and the third wall 93. In this manner, the HDD 10 according to the present embodiment can prevent or reduce deterioration in resonance characteristics of the slider 46.

In addition, the second wall 92 is spaced apart from the two first walls 91, creating the gaps G in the PI pattern 90. This allows the adhesive 101 to flow out from the inner space of the PI pattern 90. As such, the HDD 10 can prevent or reduce such a situation that a variation in amount of the adhesive 101 results in a variation in distance between the surface 61b of the backing plate 61 and the slider 46.

The PI pattern 90 includes a plurality of fourth walls 94 and a labyrinth seal Ls. The plurality of fourth walls 94 are spaced apart from each other and from the two first walls 91, the second wall 92, and the third wall 93. The labyrinth seal Ls restricts an adhesive (e.g., unsolidified adhesive 101) from passing through the intervals Cl between the two first walls 91 and the plurality of fourth walls 94. This can make the adhesive 101 easily flow toward the second wall 92. The HDD 10 according to the present embodiment can avoid or reduce deterioration in resonance characteristics of the slider 46 by causing the adhesive 101 to flow toward the trailing end 81c of the slider 46.

Each of the two first walls 91 has a plurality of separate walls 99 away from each other. The labyrinth seal Ls restricts the adhesive 101 from passing through the intervals Cl among the two first walls 91, the plurality of fourth walls 94, and the plurality of separate walls 99. As a result, the adhesive 101 can easily flow toward the second wall 92.

The flexure 53 includes a plurality of pads 75 joined to the slider 46. The second wall 92 is located between the adhesive 101 and the plurality of pads 75. Thereby, the second wall 92 can avoid or restrict the adhesive 101 from reaching the plurality of pads 75.

The third wall 93 is located between the adhesive 101 and the plurality of pads 75. The third wall 93 obstructs the flow of the adhesive 101 to cause the adhesive 101 to branch. Thereby, the third wall 93 can avoid or restrict the circumferential center Cn part of the adhesive 101 from spreading beyond the second wall 92.

The adhesive 101 has a first part 105, a second part 106, and a third part 107. The first part 105 is located between the two first walls 91. The second part 106 protrudes from the first part 105 to be in-between one of the two first walls 91 and the third wall 93. The third part 107 protrudes from the first part 105 to be in-between the other one of the two first walls 91 and the third wall 93. The third wall 93 is located between the second part 106 and the third part 107. That is, the PI pattern 90 allows the adhesive 101 to form a substantially V-shape tapered toward the axis Ax2. As a result, the PI pattern 90 allows a larger part of the adhesive 101 to be located in the vicinity of the trailing end 81c of the slider 46, and can restrict the adhesive 101 from spreading beyond the second wall 92.

The adhesive 102 is spaced apart from the adhesive 101 and the PI pattern 90 and is closer to the axis Ax2 than the adhesive 101 and the PI pattern 90, to attach the slider 46 to the suspension 45. Using such an adhesive 102, the slider 46 can be more firmly attached to the suspension 45 and prevented or restricted from falling off or coming off from the flexure 53.

The adhesive 101 has a larger volume than the adhesive 102. The adhesive 102 thus spreads relatively small, so that the adhesive 102 is unlikely or less likely to cause deterioration in resonance characteristics of the slider 46.

The PI pattern 90 includes a plurality of protrusions 96. The plurality of protrusions 96 protrude from the surface 61b between the two first walls 91. As a result, the plurality of protrusions 96 restrict the adhesive 101 from flowing toward the two first walls 91. Accordingly, the adhesive 101 can easily flow toward the second wall 92.

Each of the plurality of protrusions 96 has a cross shape. In other words, at least a part of each protrusion 96 extends in a direction intersecting the flow of the adhesive 101. Accordingly, the plurality of protrusions 96 can more effectively restrict the flow of the adhesive 101.

The PI pattern 90 includes a table 95. The table 95 is located between the two first walls 91 and apart from the second wall 92. In a substantially Z direction orthogonal to the surface 61b, the table 95 has a smaller thickness than each of the two first walls 91. That is, the table 95 creates a narrower space between the table 95 and the slider 46 than the space between the surface 61b and the slider 46. This allows the adhesive 101 to easily flow toward the second wall 92.

The flexure 53 includes a base layer 62 formed on the surface 61b, a cover layer 63 covering the base layer 62, and a conductive layer 64 interposed between the base layer 62 and the cover layer 63. The PI pattern 90 is included in at least one of the base layer 62 and the cover layer 63. Namely, the PI pattern 90 can be formed in the process of forming the base layer 62 and/or the process of forming the cover layer 63. This makes it possible to prevent an increase in the number of the manufacturing processes of the HDD 10 according to the present embodiment, facilitating the manufacture of the HDD 10.

The adhesive 101 attaches the slider 46 to the suspension 45. The flexure 53 of the suspension 45 includes a backing plate 61, a surface 61b of the backing plate 61 to which the adhesive 101 adheres, and a PI pattern 90 formed on the surface 61b to surround at least a part of the adhesive 101. The adhesive 101 has two extending parts 109 extending closer to each other toward the axis Ax2 of the carriage 35. Each of the two extending parts 109 has an end 109a and an end 109b further away from the axis Ax2 than the end 109a. The end 109a of a first one of the two extending parts 109 and the end 109a of a second one of the two extending parts 109 are connected to each other. The end 109b of the first one of the two extending parts 109 and the end 109b of the second one of the two extending parts 109 are spaced apart from each other in the circumferential direction about the axis Ax2.

The adhesive 101 has a substantially V-shape tapered toward the axis Ax2. Due to such a shape, a larger part of the adhesive 101 can be applied in the vicinity of the trailing end 81c of the slider 46. In addition, the PI pattern 90 restricts the spread of the adhesive 101. Owing to such features, the HDD 10 according to the present embodiment can avoid or reduce deterioration in resonance characteristics of the slider 46. Furthermore, with the adhesive 101 adhered to the PI pattern 90, the slider 46 can be more firmly attached to the flexure 53 and prevented from falling off or coming off from the flexure 53.

A part (the third wall 93) of the PI pattern 90 is located between the end 109b of a first one of the two extending parts 109 and the end 109b of a second one of the two extending parts 109. That is, the PI pattern 90 allows the adhesive 101 to form a substantially V-shape tapered toward the axis Ax2. As a result, the PI pattern 90 can allow a larger part of the adhesive 101 to be in the vicinity of the trailing end of the slider 46 and can prevent or restrict the adhesive 101 from spreading beyond the second wall 92.

The PI pattern 90 includes a plurality of walls (first walls 91, fourth walls 94, and separate walls 99) spaced apart from each other and a labyrinth seal Ls. The labyrinth seal Ls restricts the adhesive from passing through the intervals Cl among the plurality of walls. As a result, the HDD 10 can guide the adhesive 101 to spread in a desired direction. Note that the direction in which the labyrinth seal Ls guides the spread of the adhesive 101 is not limited to the direction of the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a magnetic disk;
a slider configured to read and write information from and to the magnetic disk;
a carriage configured to rotate about a rotation axis;
a suspension that is attached to the carriage; and
a first adhesive that attaches the slider to the suspension, wherein
the suspension includes a base plate attached to the carriage, a load beam attached to the base plate, and a flexure attached to the load beam;
the flexure includes
a metal plate,
an outer surface of the metal plate to which the first adhesive adheres, and
an insulator located on the outer surface to surround at least a part of the first adhesive, the insulator including
two first walls extending closer to each other toward the rotation axis,
a second wall spaced apart from the two first walls and further away from the rotation axis than the two first walls, and extending across a center of the insulator in a circumferential direction about the rotation axis, and
a third wall located at least partially at the center of the insulator in the circumferential direction and located between the two first walls and the second wall, the third wall being shorter in length than the second wall in the circumferential direction; and
a distance between the second wall and the third wall is shorter than a distance between each of the two first walls and the third wall.

2. The disk device according to claim 1, wherein
the insulator includes
a plurality of fourth walls spaced apart from each other and from the two first walls, the second wall, and the third wall, and
a labyrinth seal configured to restrict the first adhesive from passing through intervals between the two first walls and the plurality of fourth walls.

3. The disk device according to claim 2, wherein
each of the two first walls includes a plurality of fifth walls spaced apart from each other, and
the labyrinth seal is configured to restrict the first adhesive from passing through intervals among the two first walls, the plurality of fourth walls, and the plurality of fifth walls.

4. The disk device according to claim 1, wherein
the flexure includes a plurality of pads joined to the slider, and
the second wall is located between the first adhesive and the plurality of pads.

5. The disk device according to claim 4, wherein
the third wall is located between the first adhesive and the plurality of pads.

6. The disk device according to claim 1, wherein
the first adhesive includes
a first part located between the two first walls,
a second part protruding from the first part to be in-between a first one of the two first walls and the third wall, and
a third part protruding from the first part to be in-between a second one of the two first walls and the third wall, and
the third wall is located between the second part and the third part.

7. The disk device according to claim 1, further comprising:
a second adhesive spaced apart from the first adhesive and the insulator and closer to the rotation axis than the first adhesive and the insulator, the second adhesive attaching the slider to the suspension.

8. The disk device according to claim 7, wherein
the first adhesive has a larger volume than the second adhesive.

9. The disk device according to claim 1, wherein
the insulator has a plurality of protrusions protruding from the outer surface between the two first walls.

10. The disk device according to claim 9, wherein
each of the plurality of protrusions has a cross shape.

11. The disk device according to claim 1, wherein
the insulator includes a sixth wall located between the two first walls and apart from the second wall, and
the sixth wall has a smaller thickness than each of the two first walls in a direction orthogonal to the outer surface.

12. The disk device according to claim 1, wherein
the flexure further includes
a first insulating layer formed on the outer surface,
a second insulating layer covering the first insulating layer, and
a conductive layer interposed between the first insulating layer and the second insulating layer, and
the insulator is included in at least one of the first insulating layer and the second insulating layer.

13. The disk device according to claim 1, wherein
the first adhesive includes two extending parts extending closer to each other toward the rotation axis,
each of the two extending parts has a first end and a second end further away from the rotation axis than the first end,
the first end of a first one of the two extending parts and the first end of a second one of the two extending parts are connected to each other, and
the second end of the first one of the two extending parts and the second end of the second one of the two extending parts are spaced apart from each other in a circumferential direction about the rotation axis.

14. The disk device according to claim 13, wherein
a part of the insulator is located between the second end of the first one of the two extending parts and the second end of the second one of the two extending parts.

15. The disk device according to claim 1, wherein
the insulator includes a plurality of fourth walls spaced apart from each other, and a labyrinth seal configured to restrict the first adhesive from passing through an interval between the plurality of fourth walls.

* * * * *